April 25, 1933.  E. J. MARTEL  1,905,237
CHAIN FOR AUTOMOBILE TIRES
Filed March 20, 1929
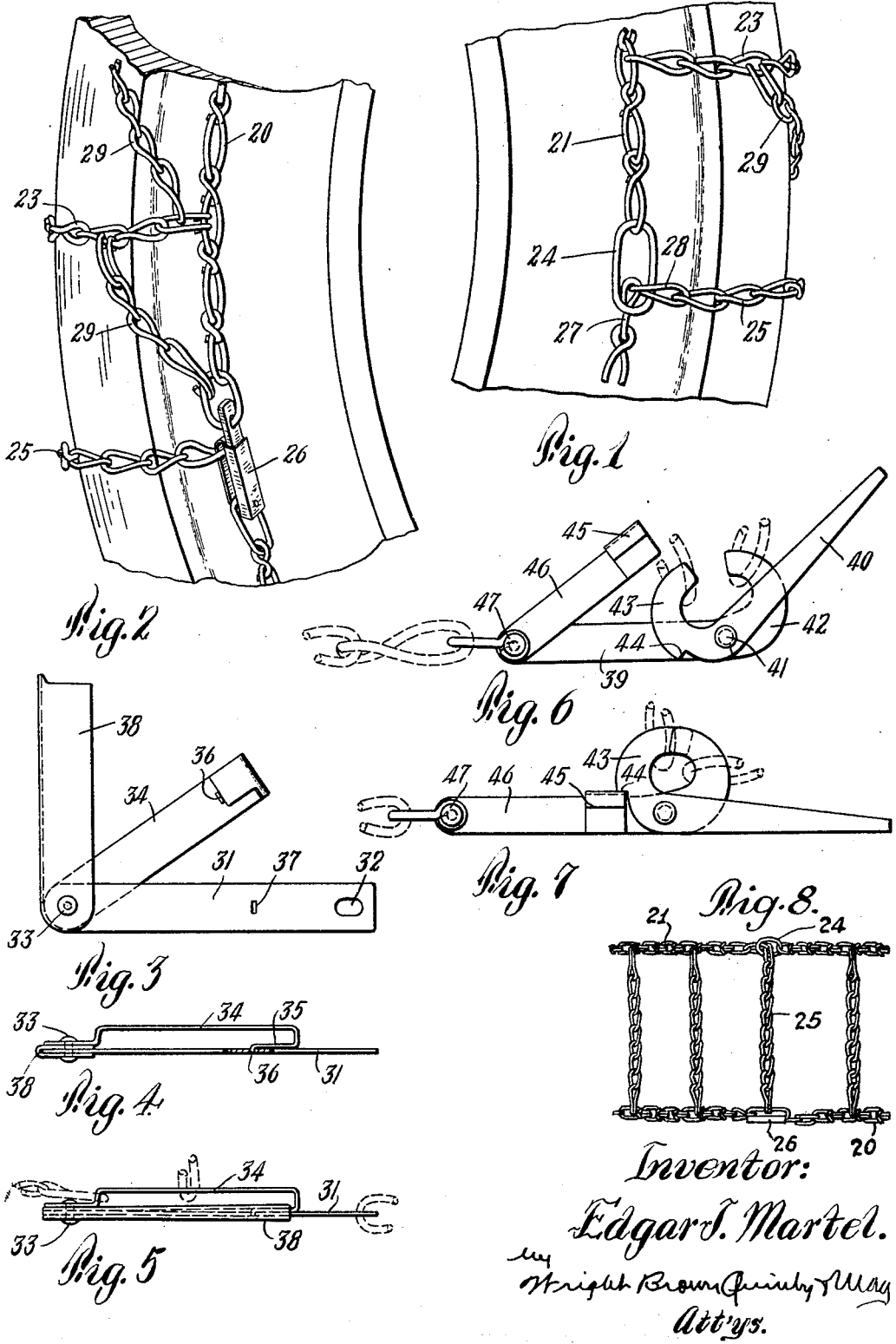
Inventor:
Edgar J. Martel.
by Wright Brown Quinby & May
Att'ys.

Patented Apr. 25, 1933

1,905,237

UNITED STATES PATENT OFFICE

EDGAR J. MARTEL, OF LACONIA, NEW HAMPSHIRE

CHAIN FOR AUTOMOBILE TIRES

Application filed March 20, 1929. Serial No. 348,555.

This invention relates to anti-skid chains for automobile tires. An object of the invention is to provide a chain which is capable of being put on a tire conveniently and which may be secured in place without the necessity of reaching to the inner side of the tire to get at a clasp or catch. To this end I provide a short extension which may comprise a length of chain secured to the portion of the chain which goes against the inner side of the tire. This short length has a free end which may be passed through a suitable eye in the opposite end of the chain, then passed over the tire to fasten in a catch located on the outside of the tire as hereinafter described.

Another object of the invention is to minimize lateral skidding by the provision of suitably arranged diagonal links in conjunction with the regular cross-links. The invention furthermore relates to improved clasps or catches by which the free ends of the chains may be secured together, and to cross links made of material having an angular cross section so as to afford a better grip on slippery surfaces than is obtainable with the usual chain links of round stock.

Further advantageous features of construction will be apparent to one skilled in the art from the description of the invention which follows, and from the drawing, of which,—

Figure 1 shows in elevation a portion of the inner side face of an automobile tire having thereon a tire chain embodying the invention.

Figure 2 is a fragmentary perspective view of the outer side face of the tire chain shown in Figure 1.

Figure 3 is an elevation of a clasp or fastener for a tire chain.

Figure 4 is a plan view of the same, a portion being broken away.

Figure 5 is a plan view of the same with the parts in closed position.

Figure 6 is an elevation of a modified form of fastener in open position.

Figure 7 is an elevation of the same in closed position.

Figure 8 is a fragmentary plan view of an automobile tire chain embodying the invention.

The invention hereinafter described in detail is designed to obviate the necessity of reaching in behind an automobile wheel in order to secure a clasp or fastener adjacent to the inner side face of the tire. According to the invention the tire chain illustrated in Figures 1 and 2 may comprise a pair of side members 20 and 21, the former being adapted to lie against the outer side face of a tire while the latter is designed to lie against the inner side face of the tire. These side members may, as shown, be made of chain of suitable weight and may be connected at suitable intervals by cross links 23 in a manner well known in the art, these cross links being designed to extend from one side face to the other over the tread of the tire so that these cross links are effective in gripping the road when the chain is properly placed upon the tire. The side member 21 may have at one end thereof a suitable eye 24, this eye being preferably of sufficient size to permit a chain of the same size as that used for the cross links 23 to pass freely therethrough. At the opposite end of the side member 21 I may provide a flexible extension 25 which is of sufficient length to pass through the eye 24 and over the tread of the tire so as to reach a clasp or fastener 26 on the outer face of the tire.

The clasp 26, as shown in Figure 2, may be permanently secured to one end of the side member 20, the clasp being adapted to engage and hold the opposite end link of this side member as well as a link of the extension 25. In mounting a chain of the kind described upon an automobile tire, the chain may first be placed around the tire so that the cross links 23 pass across the tread, the side member 21 is against the inner side face of the tire, and the side member 20 is against the outer side face. The extension 25 is passed through the eye 24 and is drawn up taut so as to take the slack out of the side member 21. The ends of the side member 20 are brought together and secured by the clasp 26, and the extension 25 is carried across the tread of the tire and secured to the clasp 26. As shown in Figure 1, when the extension 25 is drawn taut through the eye 24 and then is led off in a direction at right angles to the standing part thereof the adjacent links 27 and 28 thereof, which are in contact with the eye 24, will be substantially at right angles to each other so that when the extension 25 is secured to the clasp 26, the extension is caught by the angular relation between the links 27 and 28 and the side member 21 is kept taut, since the extension 25 is not allowed to slip back to any extent through the eye 24. If desired, the links 27 and 28 may be made longer than the other links of the chain so as to augment the locking effect of the angularity between the two links. It is obvious, furthermore, that when the chain is to be removed from the tire it will be unnecessary to reach behind the tire in order to release a clasp. The only clasp to be released will be on the outer accessible side face of the tire. When released from the clasp 26, the extension 25 will slide freely through the eye 24 and the chain may then readily be removed.

In order to reduce the possibility of side slip when an automobile is skidding, I may provide a series of diagonal links 29 which, as shown, may each be secured at one end to one of the cross links 23, the other end being secured to one of the side members, such as the outer member 20, in such a way that the diagonal link 29 makes acute angles with the cross links 23 and the side member to which they are attached. Thus if an automobile tends to slide sidewise in skidding, the diagonal links 29 of one of the wheels will be presented transversely to the direction of skid and will thus be effective in checking such side slip.

A clasp for securing the ends of the side member 20 together and for securing the extension 25 thereto is illustrated in Figures 3, 4 and 5. This may comprise a flat bar 31 having an eye 32 in the end thereof to receive permanently one end of the side member 20. Pivoted adjacent to the opposite end of the bar 31, as at 33, is a link portion 34, this member being spaced for the greater part of its length from the bar 31, as shown in Figure 4, to provide room for the reception of chain links to be secured. The portion of this member remote from the pivot 33 is bent inwardly as at 35 and is provided with a projection 36 adapted to enter a recess 37 in the bar 31. In order to lock the projection 36 within the recess 37 I may provide a channel piece 38 pivoted at one end to the bar 31, as at 33. This channel piece is adapted to be swung down so as to engage the mutually remote faces of the portion 35 and the bar 31, as illustrated in Figure 5, so as to prevent the removal of the projection 36 from the recess 37 and thus to maintain the clasp in locked position.

A modified form of clasp is illustrated in Figures 6 and 7, this clasp comprising a pair of bars 39, 40, these bars being mutually hinged as at 41. The bar 39 is provided with a hook-shaped portion 42 on the further side of the pivot 41, the bar 40 being likewise provided with a similar hook-shaped portion 43 beyond the pivot 41. These hooks are arranged in mutual opposition so as to be capable of being moved to form a closed eye as shown in Figure 7. The outer edge of the hook 43 may be formed with a suitable shoulder 44, this shoulder being so located as to be spaced a short distance about an edge of the bar 39 when the clasp is in closed position, as illustrated in Figure 7. I may provide a locking piece 45 to enter the space between the shoulder 44 and the adjacent edge of the bar 39 so as to prevent relative pivotal movement between the bars 39 and 40 in a direction to open the eye formed by the hooks 42, 43. For convenience this locking piece 45 may be carried on the end of an arm 46 which may be hinged to the bar 39 as at 47, the shoulder being movable sufficiently beyond the edge of the bar 39 to permit the locking piece 45 to swing into place. In using a clasp of this type, the bar 40 is manipulated to separate the hooks 42 and 43 so as to permit the engagement of chain links therewith. The bar 40 will then be swung so as to close the eye formed by these hooks and thus to retain the links therein. When in closed position, the locking piece 45 may be moved into locking position between the shoulder 44 and the bar 39.

An embodiment of this invention having thus been described, it should be evident to those skilled in the art that various changes and modifications might be made therein without departing from its spirit or scope as defined by the appended claims.

I claim:

1. An anti-skid chain for tires, comprising a pair of flexible side members, a series of cross links connecting said side members at intervals, a flexible extension on one end of one of said side members having a free end, means on the other end of the same side member for slidably engaging said extension, and means for attaching the free end of said extension to the other said side member.

2. An anti-skid chain for tires, comprising a pair of flexible side members, a series of cross links connecting said side members at intervals, an eye on an end of one of said side members, an extension on the other end of the same side member having a free end adapted to pass through said eye and over the tread of the tire to said other side member, and means carried by said other side member for securing both its ends to said extension.

3. An anti-skid chain for tires, comprising a pair of flexible side members adapted to rest against opposite sides of a tire, cross links connecting said side members at intervals and adapted to pass over the tread of the tire from one side to the other, an eye on one end of one of said side members, a flexible extension on the other end of the same side member having a free end adapted to pass through said eye and across the tread of a tire to the other side member, and means for securing said flexible extension to said other side member.

4. An anti-skid tire chain including a pair of side chains; special terminal links carried on one end of each of said side chains; cross chains connecting said side chains at spaced intervals; one of said side chains having an end extension for locking engagement through said terminal links of said side chains; and a locking member carried on the remaining end of the other side chain and adapted for removable locking engagement with the end extension of the first side chain and also for locking engagement with the first mentioned end of the said second side chain.

5. An anti-skid tire chain including inner and outer side chains; cross chains connecting said side chains; special terminal links carried by one end of said side chains; and end extension formed on the other end of the said inner side chain and adapted for adjustable locking engagement in said special terminal links of said side chains when extended across the tire as the anti-skid tire chain is placed on a tire; and a locking member carried on the remaining end of said outer side chain with hooks at its opposite ends; one of said hooks being adapted for removable locking engagement with the extended end of said inner side chain, while the hook at the other end of said locking member is adapted for removable locking engagement with the first mentioned end of the outer side chain to lock the entire anti-skid tire chain on the tire.

In testimony whereof I have affixed my signature.

EDGAR J. MARTEL.